United States Patent
Zhang et al.

(10) Patent No.: US 12,234,522 B2
(45) Date of Patent: Feb. 25, 2025

(54) METHOD FOR CONTROLLING CARBIDE NETWORK IN A BEARING STEEL WIRE ROD BY CONTROLLING COOLING AND CONTROLLING ROLLING

(71) Applicants: JIANGYIN XINGCHENG GOLD MATERIALS CO., LTD, Jiangsu (CN); JIANGYIN XINGCHENG SPECIAL STEEL WORKS CO., LTD, Jiangsu (CN)

(72) Inventors: Lin Zhang, Jiangsu (CN); Jianfeng Zhang, Jiangsu (CN); Changhe Lu, Jiangsu (CN); Yuehui Guan, Jiangsu (CN); Guozhong Li, Jiangsu (CN); Xiaohong Xu, Jiangsu (CN); Yun Bai, Jiangsu (CN); Hao Zong, Jiangsu (CN); Jiafeng He, Jiangsu (CN); De Chen, Jiangsu (CN); Zhen Huang, Jiangsu (CN); Jia Yang, Jiangsu (CN)

(73) Assignees: JIANGYIN XINGCHENG GOLD MATERIALS CO., LTD, Jiangsu (CN); JIANGYIN XINGCHENG SPECIAL STEEL WORKS CO., LTD, Jiangsu (CN)

( * ) Notice: Subject to any disclaimer, the term of this patent is extended or adjusted under 35 U.S.C. 154(b) by 824 days.

(21) Appl. No.: 17/607,869

(22) PCT Filed: Nov. 8, 2019

(86) PCT No.: PCT/CN2019/116432
§ 371 (c)(1),
(2) Date: Oct. 30, 2021

(87) PCT Pub. No.: WO2020/094106
PCT Pub. Date: May 14, 2020

(65) Prior Publication Data
US 2022/0364199 A1    Nov. 17, 2022

(30) Foreign Application Priority Data

Nov. 9, 2018 (CN) .......................... 201811329247.2

(51) Int. Cl.
*C21D 11/00* (2006.01)
*C21D 6/00* (2006.01)
(Continued)

(52) U.S. Cl.
CPC ............ *C21D 11/005* (2013.01); *C21D 6/004* (2013.01); *C21D 6/005* (2013.01); *C21D 6/008* (2013.01);
(Continued)

(58) Field of Classification Search
CPC .......... C21D 1/60; C21D 1/78; C21D 11/005; C21D 2211/004; C21D 6/004;
(Continued)

(56) References Cited

FOREIGN PATENT DOCUMENTS

CN      1383940 A    12/2002
CN    101586182 A    11/2009
(Continued)

OTHER PUBLICATIONS

International Search Report of PCT/CN2019/116432 mailed on Feb. 7, 2020, ISA/CN.

*Primary Examiner* — Nicholas A Wang
(74) *Attorney, Agent, or Firm* — Yue (Robert) Xu; Apex Attorneys at Law, LLP

(57) ABSTRACT

A method for controlling carbide network in a bearing steel wire rod by controlling cooling and rolling, comprises the following steps: rapidly rolling a bar to a wire rod and spinning it into a loose coil, controlling the rolling temperature at 780° C.-880° C.; and the spinning temperature at 750° C.-850° C.; carrying out on-line controlling cooling of continuous loose coils using EDC water bath austempering (Continued)

cooling process, controlling the cooling rate at 2.0° C./s-10° C./s, and controlling the final cooling temperature within 620-630° C.; after EDC water bath austempering cooling, using slow cooling under a cover, and the temperature is controlled to be 400° C.-500° C. when being removed out of the cover; after slow cooling, collecting coils, and cooling in air to the room temperature.

10 Claims, 1 Drawing Sheet

(51) Int. Cl.
| | |
|---|---|
| *C21D 8/06* | (2006.01) |
| *C21D 9/52* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/50* | (2006.01) |

(52) U.S. Cl.
CPC ............ *C21D 8/065* (2013.01); *C21D 9/525* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C22C 38/44* (2013.01); *C22C 38/50* (2013.01)

(58) Field of Classification Search
CPC ........ C21D 6/005; C21D 6/008; C21D 8/065; C21D 9/38; C21D 9/40; C21D 9/525; C21D 1/20; C21D 9/52
See application file for complete search history.

(56) References Cited

FOREIGN PATENT DOCUMENTS

| | | | |
|---|---|---|---|
| CN | 103468904 | A | 12/2013 |
| CN | 105925909 | * | 9/2016 |
| CN | 108103282 | A | 6/2018 |
| CN | 108165716 | * | 6/2018 |
| CN | 109402356 | A | 3/2019 |
| JP | S58213824 | A | 12/1983 |
| JP | H10121206 | A | 5/1998 |
| KR | 940007371 | * | 8/1994 |

* cited by examiner

METHOD FOR CONTROLLING CARBIDE NETWORK IN A BEARING STEEL WIRE ROD BY CONTROLLING COOLING AND CONTROLLING ROLLING

CROSS-REFERENCE

The present application is a U.S. National Phase application based upon PCT Application Serial No. PCT/CN2019/116432 filed on Nov. 8, 2019, titled "CONTROLLED COOLING AND CONTROLLED ROLLING METHOD FOR CONTROL OVER BEARING STEEL WIRE CARBIDE NETWORK ", which claims the benefit of priority to Chinese patent application No. 201811329247.2 filed with the Chinese State Intellectual Property Office on Nov. 9, 2018, the entire disclosures of which are incorporated herein by reference.

TECHNICAL FIELD

This invention belongs to the technical field of steelmaking, in particular relates to a method for controlling carbide network in a bearing steel wire rod by controlling cooling and controlling rolling.

BACKGROUND ART

A carbide network is formed by being precipitated from austenite grain boundaries in slow cooling after rolling process when the final temperature is high. Once the carbide network is formed, especially the carbide is wide and thick, and surrounds the carbide grain boundary, micro cracks may be formed along the grain boundary in the later processing and use process, which will greatly reduce a service life of a roller.

First, it may be impossible to completely eliminate the serious carbide network in the subsequent spheroidizing annealing, so grinding cracks could be produced in bearing processing, also called cracks, second, if the original carbide is seriously networked, it cannot be eliminated by spheroidizing annealing, but may even retain in a quenched structure later. In this case, quenching cracks may easily be produced, even if no cracks are generated during quenching, the carbide network will also cause fatigue cracks in the future use.

When a carbide network structure exists in the bearing steel, it will increase the brittleness of the steel and reduce the fatigue life of the bearing parts. Hence, no serious carbide network structure is allowed in the bearing steel structure that is under use.

Application No. 201410100665.X discloses a niobium microalloyed high-carbon chromium bearing steel and its hot rolling production method. Based on the grain refinement effect of a niobium and its impact on carbides, the carbide network may be very thin or even there is no carbide network. The invention increases the difficulty of steelmaking while increasing the steelmaking cost through constituent adjustment, and it cannot guarantee the subsequent controlling cooling process, so it is impossible to achieve control over precipitation of a carbide network.

Application No. 200910062664.X discloses a method for reducing a carbide network level in a bearing steel wire rod, wherein the method is characterized in that it controls reduction of a wire rod temperature by cooling in air after spinning, and the air cooling speed is controlled to 2° C./s-10° C./s; the method could controlling cooling of a wire rod, but there may be a large temperature difference between that at the mipoint and that at the lap point in the wire rod after air cooling, so it may cause uneven quality of the overall carbide network on the wire rod.

DETAILED DESCRIPTION OF THE INVENTION

Considering the above-mentioned prior art, the present invention aims to provide a method for suppressing the formation of carbide networks in a bearing steel wire rod using controlling cooling and controlling rolling, so as to control precipitation of a large amount of $Fe_3C$ from the wire rod.

The present invention adopts the following technical solution to solve the above problems: a method for controlling carbide network in a bearing steel wire rod by controlling cooling and controlling rolling, comprising:

rapidly rolling a bar to a wire rod with a specified specification and spinning it into a loose coil, controlling the final rolling temperature at 780° C.-880° C.; and controlling the spinning temperature at 750° C.-850° C.;

on-line controlling cooling of continuous loose coils using EDC water bath austempering cooling process, controlling the cooling rate at 2.0° C./s-10° C./s, and controlling the final cooling temperature at 630° C.

after EDC water bath austempering cooling, using slow cooling under a cover, and the temperature is controlled to be 400° C.-500° C. when being removed out of the cover;

After slow cooling, collecting coils, and cooling in air to the room temperature.

The rolling speed is controlled to be 8.4 m/s-34.0 m/s.

The water cooling rate of EDC water bath austempering cooling is 4.0° C./s-9° C./s.

The water bath temperature of EDC water bath austempering cooling is 90° C.-100° C.

According to wire rods of different specifications, the water bath cooling time is controlled to 20-80 s as to match the cooling rate, wherein the cooling rate is relatively lower when the wire rod has a larger diameter, and the corresponding water bath cooling time is longer.

After spinning, the wire rods are treated with controlling cooling by using EDC water bath austempering; and after being removed out of the water, the temperature difference between that at the midpoint and that at the lap point in the wire rod is ≤10° C., wherein the midpoint refers to the most front end of the coil; the lap point is a contact point at two ends of two coils, when a coil is bent over another coil. The cooling time is adjusted according to the specification, that is, adjusting the stay time of the wire rod of this specification in the water bath to meet the requirement.

After the wire rod is rolled into a reducing & sizing mill, the temperature in the reducing & sizing mill is the final rolling temperature of the wire rod.

The method of the present invention is applicable in producing Φ12 mm-25 mm high-carbon-chromium bearing steel wire rod.

The bearing steel wire rod contains the following chemical constituents (by mass percentage: C 0.95-1.05%, Si 0.15-0.35%, Mn 0.25-0.45%, Cr 1.30-1.65%, Mo≤0.10%, Ni≤0.25%, Al≤0.050%, P≤0.025%, S≤0.020%, Cu≤0.25%, Ca≤0.0010%, O≤0.0012%, Ti≤0.0050%, As≤0.040%, Pb≤0.002%, As+Sn+Sb≤0.075%, the balance is Fe and any unavoidable impurities.

The method of the present invention is applicable in producing high-carbon-chromium bearing steel wire rod with a carbide network level ≤2.5.

Compared with the prior art, the invention has the advantages that:
1. The present invention adopts EDC water bath austempering cooling, which has the advantages of fast cooling and short cooling time; and it can restrain the precipitation of a large amount of Fe3C from the wire rod. With this cooling process, the temperature of the whole wire rod is uniform after polishing and the temperature difference between that at the midpoint and that at the lap point in the wire rod is ≤10° C. The final cooling temperature of EDC water bath austempering cooling is controlled within 620-630° C., which is conductive to avoid energy release during phase transition, thereby making the temperature rising to the range of carbide network precipitation.
2. With the controlling cooling mode of EDC water bath austempering + slow cooling under a cover, a nonequilibrium sorbite microstructure of a wire rod is obtained to form short-strip or hemispherical carbides in the wire rod structure so that the carbide network is finally controlled. In this way, the carbide network level of Φ12 mm-25 mm high-carbon-chromium bearing steel wire rod is reduced from >3.0 to ≤2.5 on, reaching the level 1.5.
3. EDC water bath isothermal quenching cooling uses a mixed liquid of water and RX medium (halogenated hydrocarbon, bromoethane) as a cooling medium, and water vapors generated in the cooling process do not cause pollution to the environment or have any impact on human health, which is in compliance with the requirement of the green and environmental protection production method proposed.
4. After EDC water bath austempering cooling, slow cooling under a cover is adopted to control the gradual diffusion of the core temperature to the surface and restore the uniformity of core temperature, thereby eliminating a surface stress caused by water bath cooling.
5. The water bath temperature for EDC water bath austempering cooling is within 90° C.-100° C., and the cooling speed of wire rod is strictly controlled to be 4.0° C./s~9° C./s, so as to prevent formation of brittle Bainite and Martensite structure, thus to avoid the rapid precipitation of carbide.

DESCRIPTION OF THE ATTACHED DRAWINGS

DETAILED DESCRIPTION OF EMBODIMENTS

Figure 1:
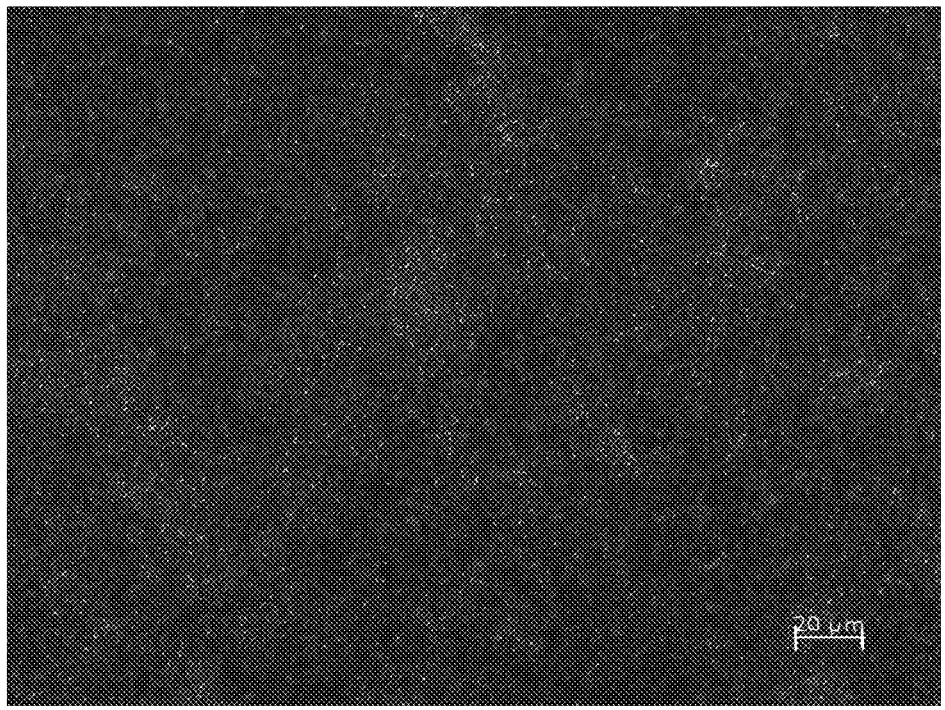
FIG. 1 depicts a schematic diagram of a carbide network form in the wire rod according to Embodiment 1 of the present invention.
Figure 2:
FIG. 2 depicts a schematic diagram of a carbide network form in the wire rod according to Embodiment 2 of the present invention.

In combination with optimal embodiments of the present invention, the method of controlling carbide network in Φ12 mm-25 mm high-carbon-chromium bearing steel wire rod using controlling cooling and controlling rolling is illustrated in detailed below. However, the embodiment is only a description of an optimal embodiment of the present invention, and does not constitute any limitation on the scope of the invention.

Embodiment 1

Φ18 mm high-carbon-chromium bearing steel wire rods are rolled to the specified size by high speed wire rolling, and fabricated into loose coils by spinning. The carbide network is controlled according to the following technological parameters: the temperature in the reducing & sizing mill (i.e. The final rolling temperature) is 830° C.-870° C., the spinning temperature of wire rods is 810° C.-850° C.; when conducting on-line controlling cooling on wire rods by EDC water bath austempering cooling after spinning, the water bath temperature is 90° C.-97° C., the water bath cooling time is 20 s-80 s; the polishing temperature of wire rods after EDC water bath cooling is 620° C.-630° C. After the wire rod are polished, slow cooling under a cover is used, the holding time is 30 min-60 min, and the temperature after slow cooling is 430-470° C. After being removed out of the cover, the coils are cooled in air to the room temperature.

Chemical constituents of the product include: C 1.0%, Si 0.32%, Mn 0.30%, Cr 1.44%, Mo 0.01%, Ni 0.02%, Al 0.014%, P 0.014%, S 0.002%, Cu 0.08%, Ca 0.0002%, O 0.0008%, Ti 0.0010%, As 0.005%, Pb 0.001%, As+Sn+Sb≤0.011%, the balance is Fe and any unavoidable impurities.

A product sample is taken to evaluate the level of a carbide network, and the carbide network level of the sample is as shown in Table 1.

Embodiment 2

Φ13.5 mm high-carbon-chromium bearing steel wire rods are rolled to the specified size by high speed wire rolling, and subjected to spinning. The carbide network is controlled according to the following technological parameters: the temperature in the reducing & sizing mill is 800° C.-850° C., the spinning temperature of wire rods is 800° C.-840° C.; after spinning and on-line EDC water bath austempering cooling on wire rods, the water bath temperature is 90° C.-97° C., the water bath cooling time is 20 s-60 s; the polishing temperature of wire rods after EDC water bath cooling is 620° C.-630° C. After the wire rods are polished, slow cooling under a cover is used, the holding time is 40 min-60 min, and the temperature after slow cooling is 420-450° C. After being removed out of the cover, the coils are cooled in air to the room temperature.

Chemical constituents of the product include: C 0.98%, Si 0.29%, Mn 0.31%, Cr 1.45%, Mo 0.01%, Ni 0.02%, Al 0.025%, P 0.012%, S 0.001%, Cu 0.09%, Ca 0.0001%, O 0.0006%, Ti 0.0006%, As 0.0013%, Pb 0.001%, As+Sn+Sb≤0.009%, the balance is Fe and any unavoidable impurities.

A product sample is taken to evaluate the level of a carbide network, and the carbide network level of the sample is as shown in Table 1.

TABLE 1

Test results of carbide networks sampled according to Embodiments 1 and 2

| Carbide network level | Test sample 1 | Test sample 2 | Test sample 3 | Test sample 4 | Test sample 5 |
|---|---|---|---|---|---|
| Embodiment 1 | 1.5 | 1.5 | 1.5 | 1.5 | 1.5 |
| Embodiment 2 | 1.5 | 1.5 | 1.5 | 1.5 | 1.5 |

As shown in Table 1, EDC water bath austempering+slow cooling under a cover is used for controlling cooling of the coils, which effectively inhibits precipitation of carbide in the cooling process, so that a non-equilibrium microstructure is obtained to form short-strip or hemispherical carbides, thereby finally controlling the carbide network.

In addition to the above embodiments, the invention also has other embodiments, and any technical scheme formed by equivalent transformation or equivalent substitution should fall within the scope of protection scope of the claims of the present invention.

The invention claimed is:

1. A method for controlling carbide network in a bearing steel wire rod by controlling cooling and controlling rolling, characterized in comprising
    rolling a bar to a wire with a specified specification and spinning it into a coil, controlling the rolling temperature at 780° C.-880° C.; and controlling the spinning temperature at 750° C.-850° C.;
    on-line controlling cooling of continuous coils using EDC water bath austempering cooling process, controlling the cooling rate at 2.0° C./s-10° C./s, and controlling a final cooling temperature within 620-630° C.;
    after EDC water bath austempering cooling, slow cooling under a cover, and the temperature is controlled to be 400° C.-500° C. when being removed out of the cover;
    after slow cooling, collecting coils, and cooling in air to a room temperature.

2. The method for controlling carbide network in a bearing steel wire rod by controlling cooling and controlling rolling according to claim 1, which is characterized in that the rolling speed is controlled to be 8.4 m/s-34.0 m/s.

3. The method for controlling carbide network in a bearing steel wire rod by controlling cooling and controlling rolling according to claim 1, which is characterized in that the water cooling rate of EDC water bath austempering cooling is 4.0° C./s-9° C./s.

4. The method for controlling carbide network in a bearing steel wire rod by controlling cooling and controlling rolling according to claim 3, which is characterized in that the temperature of EDC water bath austempering cooling is 90° C.-100° C., so as to stabilize the water cooling rate.

5. The method for controlling carbide network in a bearing steel wire rod by controlling cooling and controlling rolling according to claim 1, which is characterized in that: the water bath cooling time is controlled to 20-80 seconds.

6. The method for controlling carbide network in a bearing steel wire rod by controlling cooling and controlling rolling according to claim 1, which is characterized in that after spinning, the wire rods are treated with controlling cooling by using EDC water bath austempering; and after being removed out of the water, the temperature difference between that at the midpoint and that at the lap point in the wire rod is ≤10° C.;
    the midpoint refers to the most front end of the coil; the lap point is a contact point at two ends of two coils, when a coil is bent over another coil.

7. The method for controlling carbide network in a bearing steel wire rod by controlling cooling and controlling rolling according to claim 1, which is characterized in that: after the wire rod is rolled into a reducing & sizing mill, the temperature in the reducing & sizing mill is the final rolling temperature of the wire rod.

8. The method for controlling carbide network in a bearing steel wire rod by controlling cooling and controlling rolling according to claim 1, which is characterized in that: the method is applied to producing Φ12 mm-25 mm high-carbon-chromium bearing steel wire rod.

9. The method for controlling carbide network in a bearing steel wire rod by controlling cooling and controlling rolling according to claim 8, which is characterized in that: the bearing steel wire rod contains the following chemical constituents by mass percentage: C 0.95-1.05%, Si 0.15-0.35%, Mn 0.25-0.45%, Cr 1.30-1.65%, Mo≤0.10%, Ni≤0.25%, Al≤0.050%, P≤0.025%, S≤0.020%, Cu ≤0.25%, Ca≤0.0010%, O≤0.0012%, Ti≤0.0050%, As≤0.040%, Pb≤0.002%, As+Sn+Sb≤0.075%, the balance is Fe and any unavoidable impurities.

10. The method for controlling carbide network in a bearing steel wire rod by controlling cooling and controlling rolling according to claim 1, which is characterized in that: the method is applied to producing high-carbon-chromium bearing steel wire rod with a carbide network level≤2.5.

* * * * *